United States Patent
Mally et al.

(10) Patent No.: US 6,976,730 B2
(45) Date of Patent: Dec. 20, 2005

(54) VEHICLE BODY STRUCTURE

(75) Inventors: Thomas R. Mally, Farmington Hills, MI (US); Daniel P. Moll, Belleville, MI (US); Robert R. Blanchard, Fenton, MI (US); Douglas D. Dawe, Howell, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 32 days.

(21) Appl. No.: 10/809,696

(22) Filed: Mar. 26, 2004

(65) Prior Publication Data

US 2005/0212333 A1    Sep. 29, 2005

(51) Int. Cl.[7] .......................... B62D 25/24; E05D 15/00
(52) U.S. Cl. ................................................ 296/203.03
(58) Field of Search ...................... 296/203.03, 203.01, 296/205, 29, 30, 155, 146.1, 193.05–193.06; 49/502, 360, 209, 213

(56) References Cited

U.S. PATENT DOCUMENTS

| | | | | |
|---|---|---|---|---|
| 4,560,197 A | * | 12/1985 | Minami | 296/155 |
| 4,582,357 A | | 4/1986 | Nakamura et al. | |
| 4,976,488 A | * | 12/1990 | Asai et al. | 296/155 |
| 4,981,321 A | * | 1/1991 | Watanabe et al. | 296/155 |
| 6,152,519 A | * | 11/2000 | Blank et al. | 296/155 |
| 6,286,260 B1 | * | 9/2001 | Grabowski | 49/216 |
| 6,299,241 B1 | * | 10/2001 | Heya et al. | 296/203.03 |
| 6,494,525 B1 | * | 12/2002 | Blank | 296/187.02 |
| 6,709,045 B2 | * | 3/2004 | Shuto et al. | 296/155 |
| 6,789,840 B2 | * | 9/2004 | Honma et al. | 296/203.03 |
| 2003/0085593 A1 | | 5/2003 | Shuto et al. | |

FOREIGN PATENT DOCUMENTS

| | | | | |
|---|---|---|---|---|
| JP | 358185376 | * | 10/1983 | 296/203.03 |
| JP | 359034924 | * | 2/1984 | 296/155 |
| JP | 402068218 | * | 3/1990 | 296/155 |
| JP | 402068219 | * | 3/1990 | 296/155 |
| JP | 402077320 | * | 3/1990 | 296/155 |

* cited by examiner

Primary Examiner—H. Gutman
(74) Attorney, Agent, or Firm—Shinjyu Global IP Counselors, LLP

(57) ABSTRACT

Basically, a vehicle body structure is configured to reduce the rotation of a side roof rail that may occur during a side collision that deforms the center pillar inwardly of the vehicle body. The vehicle body structure basically includes a side rail reinforcement member located in the area where the center pillar is attached to the roof side rail. The reinforcement member can basically be divided into a first side rail reinforcement section that extends in a forward to aft direction along the roof side rail and a second side rail reinforcement section that extends in an inward direction relative to the longitudinal axis of the roof side rail. The second section of the roof side rail overlies a portion of the sliding door pocket structure that is located just rearwardly of the center pillar.

22 Claims, 18 Drawing Sheets

VEHICLE BODY STRUCTURE

BACKGROUND OF THE INVENTION

1. Field of the Invention

The present invention generally relates to a vehicle body structure. More specifically, the present invention relates to a vehicle body structure of a vehicle that is equipped with a sliding door.

2. Background Information

Various constructions of vehicles with sliding doors are known. In general, the sliding door has a slider or roller that slides along an upper guide rail installed on the roof side frame and a lower guide rail mounted on the side sill. A center pillar is usually located at the forward end of the sliding door. This center pillar connects the roof side frame to the side sill of the vehicle body structure.

The side of the vehicle body structure is constructed in a manner to minimize excessive deformation in order to protect the occupants in the event of a side collision. In other words, the side of the vehicle body structure is constructed with sufficient rigidity so that the occupants are protected. For example, a vehicle body structure having a sliding door is disclosed in U.S. Patent Publication No. 2003/0085593 in which the roof side frame is reinforced. The reinforcement member used in the vehicle body structure disclosed in this publication is disposed along the axis of the roof side frame.

In view of the above, it will be apparent to those skilled in the art from this disclosure that there exists a need for an improved vehicle body structure. This invention addresses this need in the art as well as other needs, which will become apparent to those skilled in the art from this disclosure.

SUMMARY OF THE INVENTION

It has been discovered that during a side collision, the center pillar may be deformed inwardly of the vehicle body such that a force is applied to the side roof rail that may rotate the side roof rail. In other words, when a side collision occurs, an inwardly directed force is often applied to the center pillar that may cause the roof side frame to rotate about a front to aft axis of the vehicle body structure. In the above-mentioned publication, the reinforcement member is disposed along the axis of the roof side frame. Thus, this reinforcement does not effectively minimize location rotation of the roof side frame.

It has been discovered that it is desirable to distribute the load acting on the center pillar along the entire side rail or as much as reasonably possible. By distributing the load acting on the center pillar along the side rail, it is possible to minimize the local deformation. Thus, the integrity of the side of the vehicle can be improved because the loading of the side rail from the impact force on the center pillar is transferred primarily as a translational load instead of a rotational load.

In view of the above, one object of the present invention is to provide a vehicle body structure that reduces the rotation of the side roof rail that may occur during a side collision that deforms the center pillar inwardly of the vehicle body.

To achieve this objective, a vehicle body structure is provided that comprises a center pillar, a roof side rail and a reinforcement member. The center pillar extends in a generally vertical direction of the vehicle body structure. The roof side rail is fixedly coupled to the center pillar. The roof side rail includes a generally longitudinal axis extending in a front to aft direction of the vehicle body structure, a sliding door pocket structure projecting inwardly of the longitudinal axis of the roof side rail to form a front roller receiving recess for a sliding door. The reinforcement member is coupled to the roof side rail. The reinforcement member has a first section extending along the longitudinal axis of the roof side rail to one side of the center pillar, and a second section extending inwardly from the first section at a predetermined angle such that the second section overlies the sliding door pocket structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
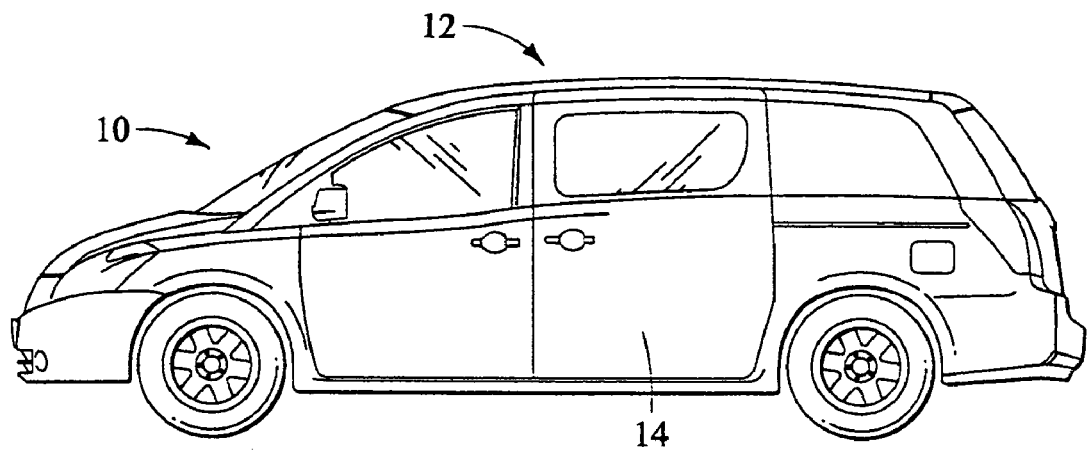
FIG. 1 is a side elevational view of a vehicle having a vehicle body structure in accordance with a first embodiment of the present invention.
Figure 2:
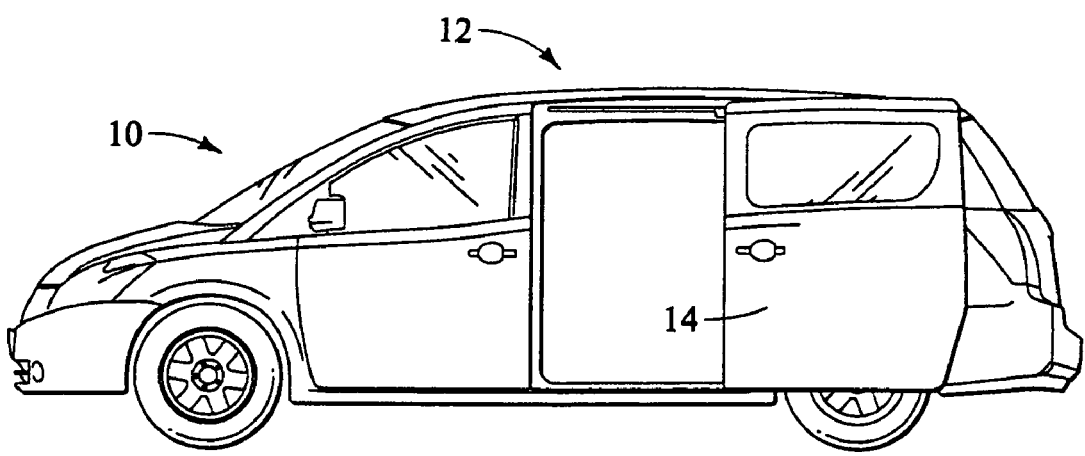
FIG. 2 is a side elevational view of the vehicle illustrated in FIG. 1 with the side sliding doors moved to their open positions.

Referring initially to FIG. 1, a vehicle 10 with a vehicle body structure 12 is illustrated in accordance with a first embodiment of the present invention. The vehicle 10 further includes a pair of sliding doors 14 (only one shown) mounted on the vehicle body structure 12 in accordance with the present invention. The sliding doors 14 are slideably mounted on the vehicle body structure 12 via three upper rollers and three lower rollers. The constructions of the sliding doors 14 and the attachment arrangements of the sliding doors 14 are relatively conventional and will not be discussed or illustrated in detail herein. Rather, it will be apparent to those skilled in the art from this disclosure that the precise construction of the sliding doors 14 and their roller structures are not critical to the present invention. Moreover, it will be apparent to those skilled in the art from this disclosure that each of the sliding doors 14 is supported on the vehicle body structure 12 in the same manner, except that they are mirror images of each other. Therefore, only the left side of the vehicle body structure 12 will be discussed and illustrated in detail herein.

The vehicle body structure 12 includes various structural support members and body panels that define the cabin of the vehicle. These parts are all fixedly coupled together utilizing conventional automobile manufacturing techniques to form a rigid body. For the sake of brevity, only those body structures that are needed to understand the present invention will be discussed and illustrated herein.

Figure 3:
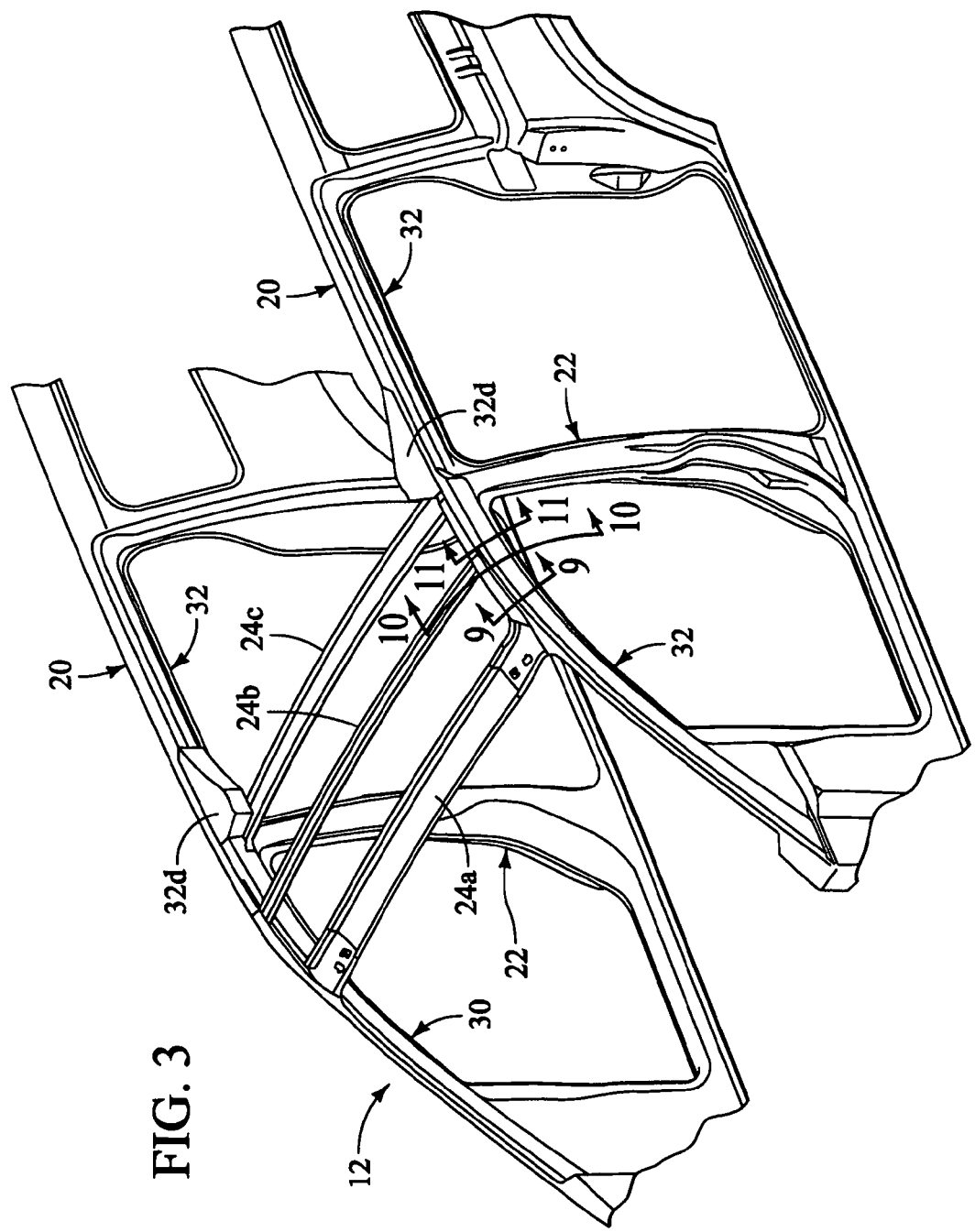
FIG. 3 is a partial perspective view of the left side of the vehicle body structure in accordance with the present invention.

As seen in FIG. 3, the vehicle body structure 12 of the present invention basically includes a pair of roof side rails 20, a pair of center pillars 22, and a plurality of cross rails 24a, 24b and 24c. Preferably, each of these portions of the vehicle body structure 12 are constructed of a rigid material such as sheet metal that is bonded (e.g., welded or cemented) together utilizing conventional automobile manufacturing techniques. Basically, the vehicle body structure 12 is configured and arranged to reduce the rotation of the side roof rails 20 that may occur during a side collision that deforms one of the center pillars 22 inwardly of the vehicle body by using reinforcing the side roof rails 20 as explained below.

Figure 4:
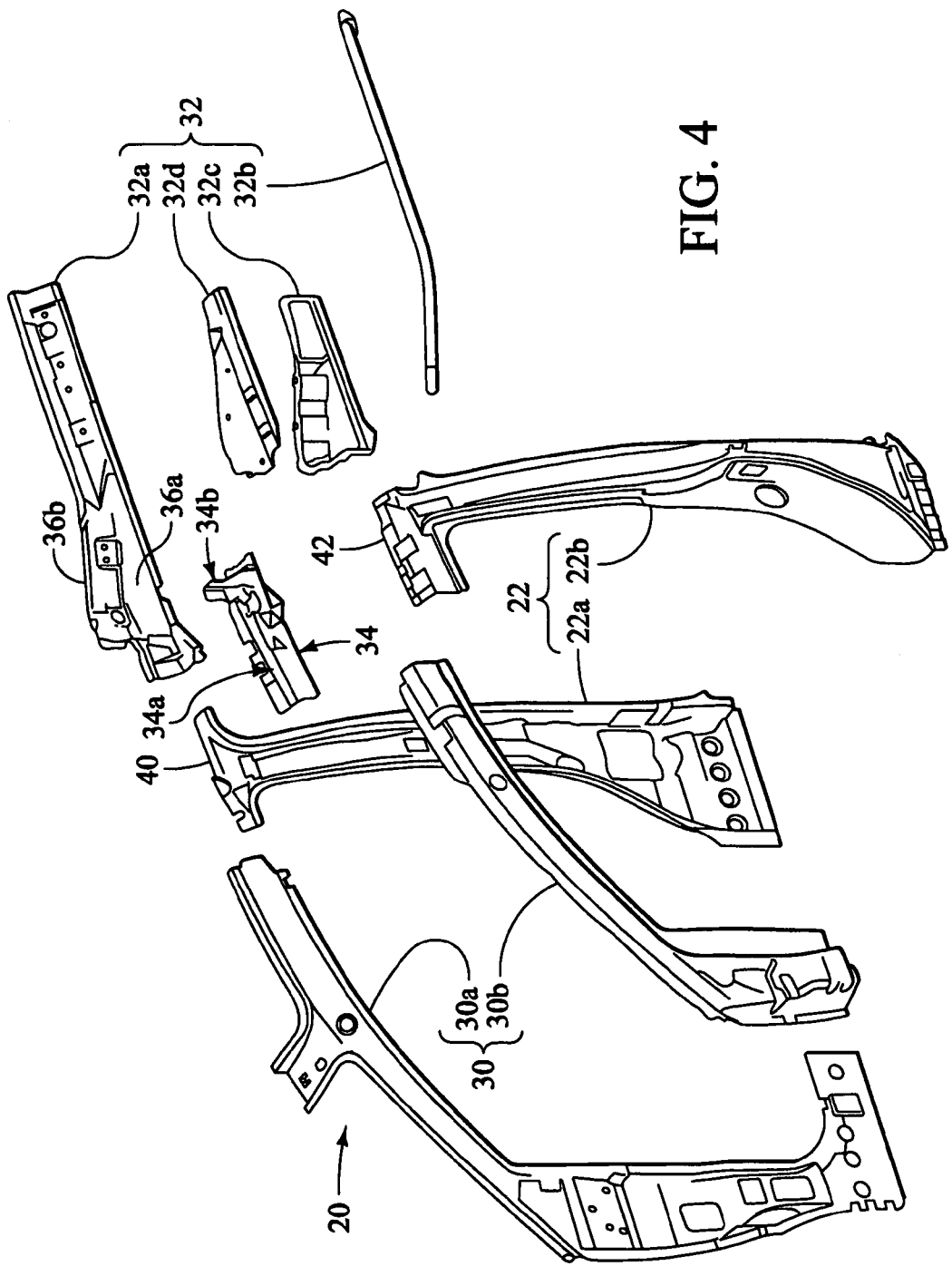
FIG. 4 is an exploded perspective view of the left side of the vehicle body structure in accordance with the present invention.

As seen in FIG. 4, the roof side rail 20 is constructed of several pieces. It will be apparent to those skilled in the art from this disclosure that the number of pieces and the locations of the joints of the pieces are not limited to the embodiment illustrated herein. In other words, the number of pieces and the locations of the joints for the roof side rail 20 can be changed without departing from the scope of the present invention. Basically, the roof side rail 20 has a front side rail portion 30, a rear side rail portion 32 and a side rail reinforcement member 34. The rear side rail portion 32 has a sliding door pocket structure 36 integrally formed therewith as discussed below in more detail. The roof side rail 20 has a center longitudinal axis A that extends in a front to aft direction of the vehicle body structure 12. In the illustrated embodiment, the center longitudinal axis A is a curved axis that follows the contour of the roof side rail 20.

The center pillar 22 is attached to the roof side rail 20 at the intersection of the front side rail portion 30 and the rear side rail portion 32 such that the sliding door pocket structure 36 is disposed rearwardly of the center vertical axes B of the center pillar 22. Preferably, a part of the center pillar 22 also forms a part of the roof side rails 20 as discussed below. The cross rail 24c is preferably connected to the roof side rails 20 such that the center of the cross rail 24c is substantially aligned with the center vertical axis B of the center pillars 22.

Preferably, the front side rail portion 30 includes an inner side rail part 30a and an outer side rail part 30b. The inner and outer side rail parts 30a and 30b are secured along their longitudinally extending edges to form a substantially closed tubular cross section of the front side rail portion 30 of the roof side rail 20. The front side rail portion 30 basically corresponds to the portion of the roof side rail 20 that forms a side support for the windshield and an upper support for the front side door opening of the vehicle body structure 12. Preferably, the inner side rail part 30a and the outer side rail part 30b are sheet metal parts that are bonded, e.g., welded, together. The rearward end of the inner side rail part 30a is bonded, e.g., welded, to the rear side rail portion 32 and the center pillar 22. The outer side rail part 30b has its rearward end bonded, e.g., welded, to the center pillar 22.

Figure 9:
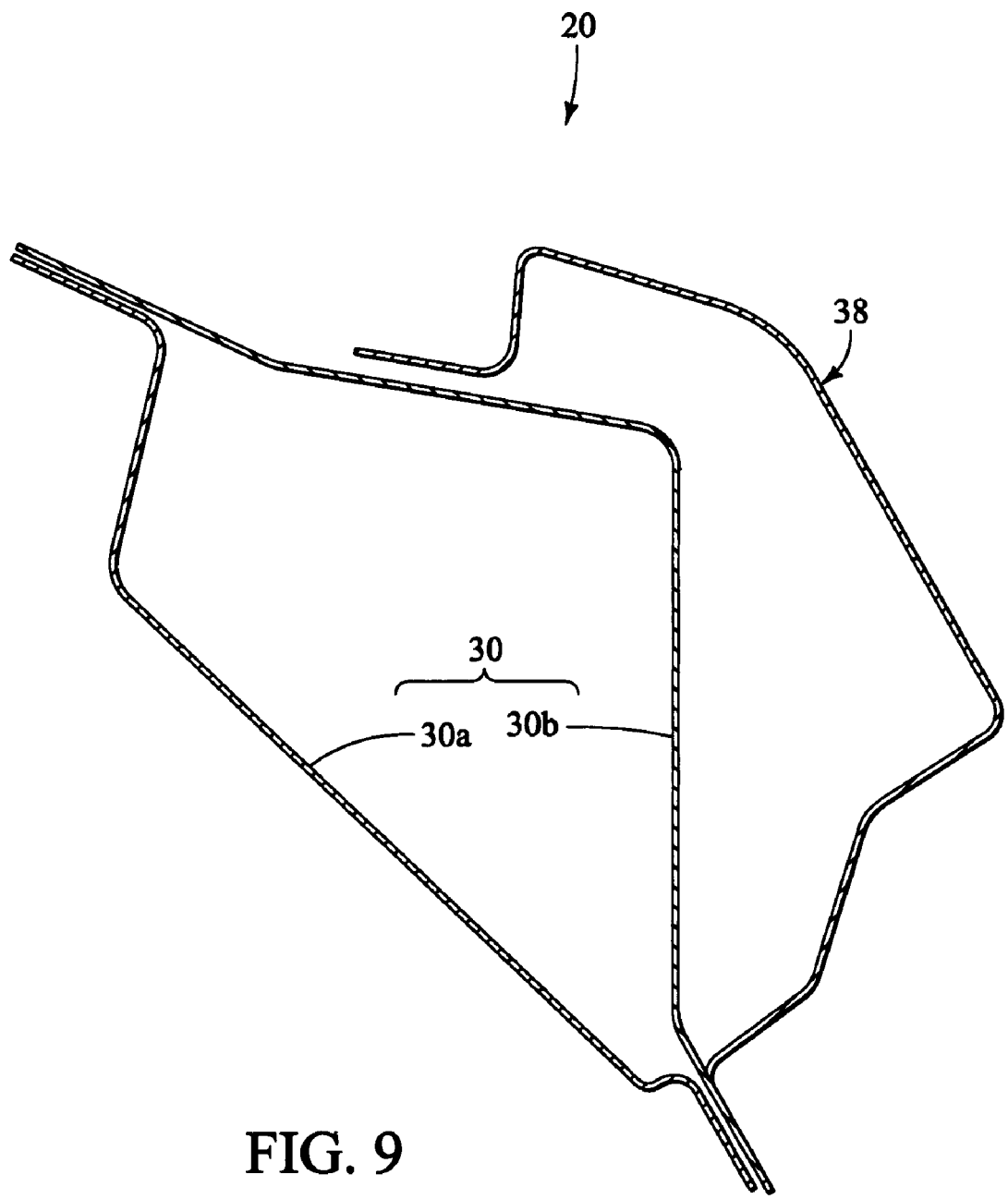
FIG. 9 is a simplified transverse cross-sectional profile view of the left roof side rail as seen along section line 9—9 of FIG. 3.
Figure 10:
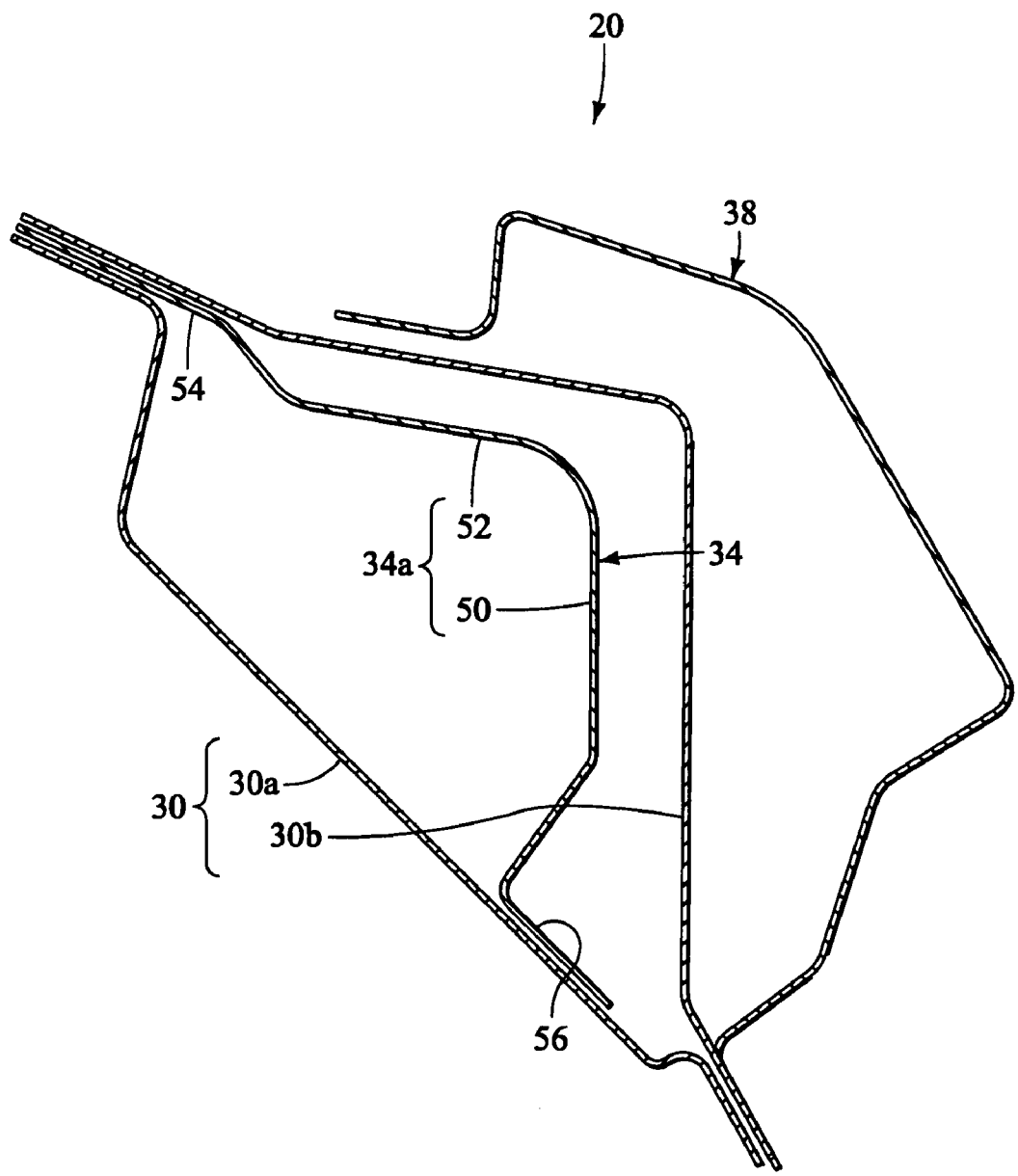
FIG. 10 is a simplified transverse cross-sectional profile view of the left roof side rail as seen along section line 10—10 of FIG. 3.
Figure 11:
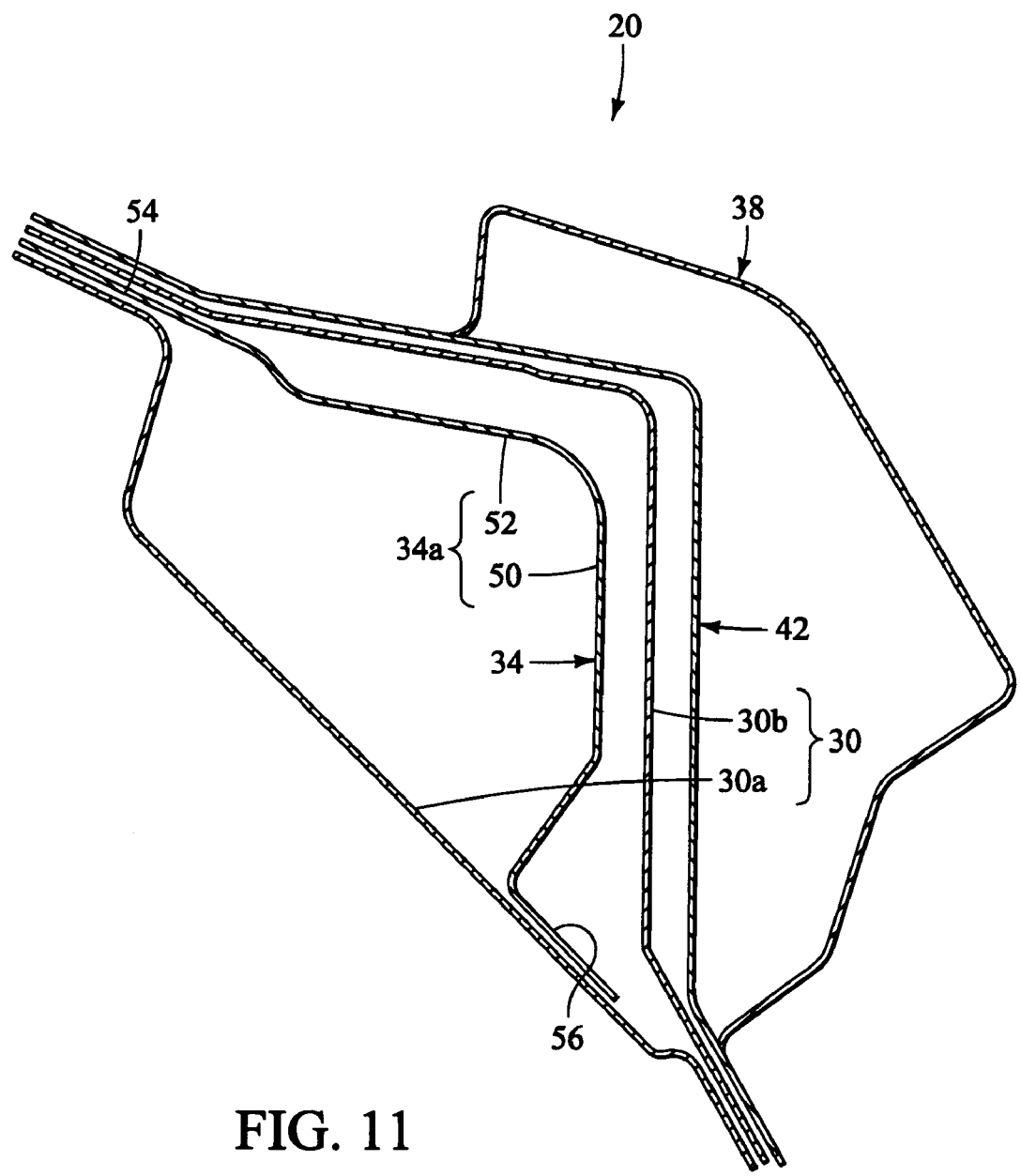
FIG. 11 is a simplified transverse cross-sectional profile view of the left roof side rail as seen along section line 11—11 of FIG. 3.

As seen in FIGS. 9–11, the roof side rail 20 has an exterior sheet metal layer 38 that forms the exterior surface of the vehicle. Since the exterior surface of the vehicle 10, including but not limited to the exterior sheet metal layer 38, is not important to the present invention, the exterior surface of the vehicle 10 will not be discussed or illustrated herein. Moreover, it will be apparent to those skilled in the art from this disclosure that a separate exterior layer is not required, but rather the parts of the vehicle 10 discussed herein can be configured to form the exterior layer of the vehicle 10.

As seen in FIGS. 10 and 11, the side rail reinforcement member 34 is partially located in between the inner and outer side rail parts 30a and 30b. Preferably, the side rail reinforcement member 34 is secured to at least one of the pairs of the longitudinal edges of the inner and outer side rail parts 30a and 30b, as discussed below. In the illustrated embodiment, the cross-sectional profile of the side rail reinforcement member 34 and the outer side rail part 30b are substantially similar such that the side rail reinforcement member 34 together with the front side rail portion 30 form a tubular portion extending in a front to aft direction of the vehicle body structure 12.

Figure 12:
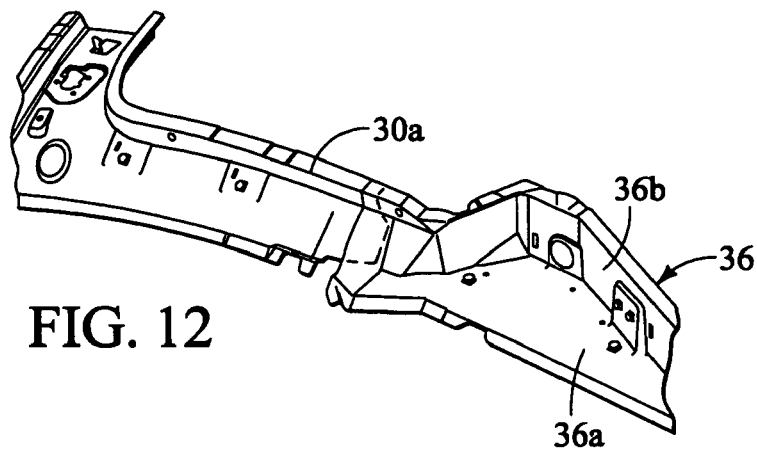
FIG. 12 is a partial perspective view of the front side rail portion and the rear side rail portion that includes the sliding door pocket structure of the left roof side rail in accordance with the present invention.

As seen in FIG. 3, the rear side rail portion 32 forms the upper support for the sliding door 14. Thus, the rear side rail portion 32 has a substantially open cross section that faces in an outboard direction of the vehicle body structure 12. The forward end of the rear side rail portion 32 is preferably fixedly coupled, e.g., welded, to the rearward end of the inner side rail part 30a of the front side rail portion 30, as seen in FIG. 12. The rear end of the rear side rail portion 32 is preferably fixedly secured, e.g., welded, to an additional rail portion (not shown).

Basically, as seen in FIG. 4, the rear side rail portion 32 includes a main support part 32a, a roller rail 32b, a pocket trim member 32c and an upper plate section or member 32d. Of course, the rear side rail portion 32 also includes other trim parts (not shown) and the outer sheet metal panel portion (not shown) to finish the appearance of the rear side rail portion 32. In the illustrated embodiment, the main support part 32 is a contoured structural part that is formed from sheet metal utilizing conventional automobile manufacturing techniques.

The sliding door pocket structure 36 is integrated within the main support part 32a as a one-piece, unitary member. Preferably, the sliding door pocket structure 36 is spaced rearwardly from the free end of the main support part 30a of the rear side rail portion 32. The pocket trim member 32c is attached to the main support part 32a utilizing conventional fastening structure such that the pocket trim member 32c substantially overlie the exteriorly facing surfaces of the sliding door pocket structure 36. The roller rail 32b is mounted to overlie the exterior surface of the main support part 32a and a portion of the sliding door pocket structure 36 after the pocket trim member 32b has been installed. The upper plate member 32d is preferably constructed of a rigid material such as sheet metal. The upper plate member 32d is rigidly attached to the upper edge of the main support part 32a such that it overlies the sliding door pocket structure 36. Thus, the upper plate member 32d adds rigidly to the upper edge of the sliding door pocket structure 36.

Figure 15:
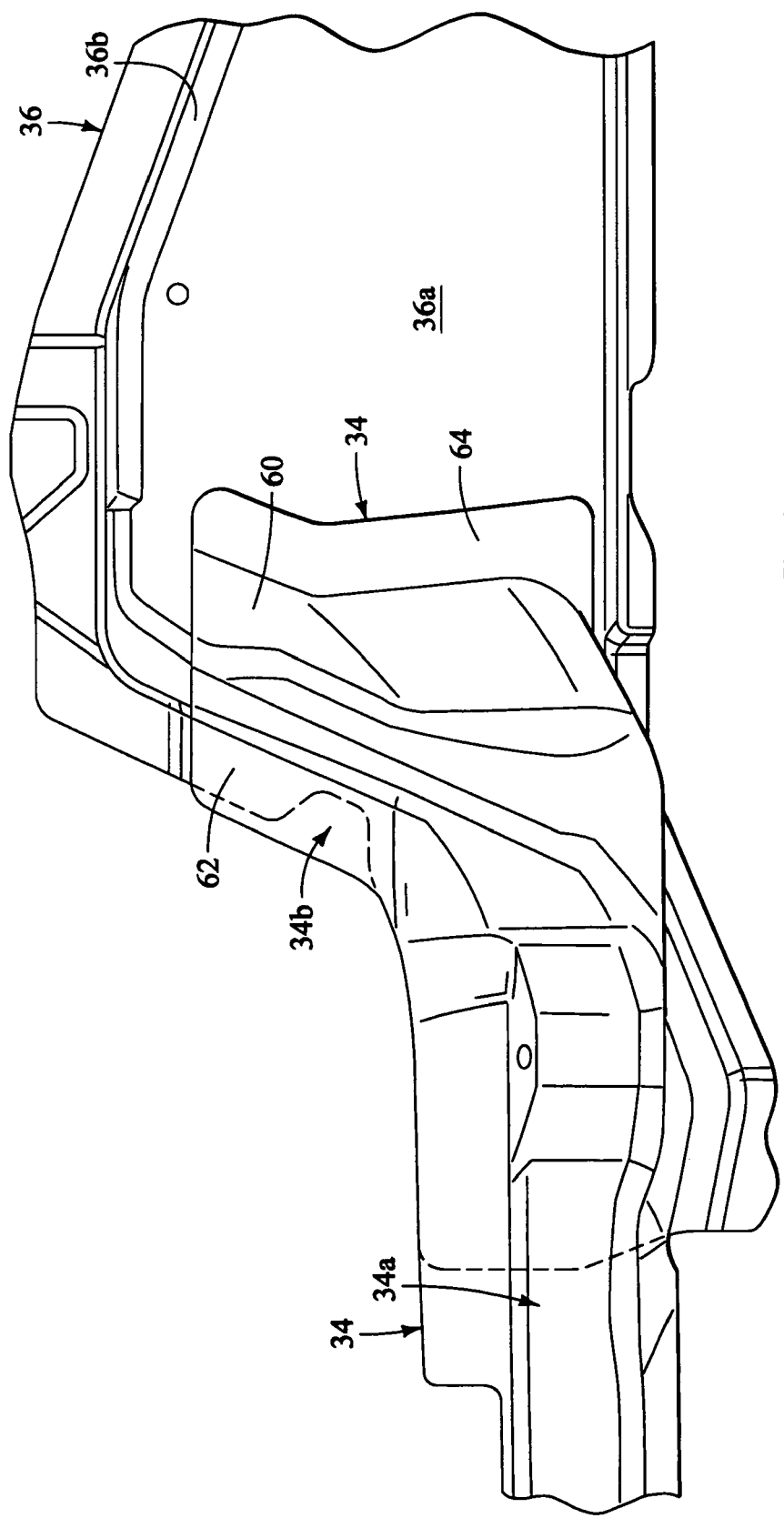
FIG. 15 is a partial top plan view showing the connection between the side rail reinforcement member and the sliding door pocket structure of the rear side rail portion.
Figure 16:
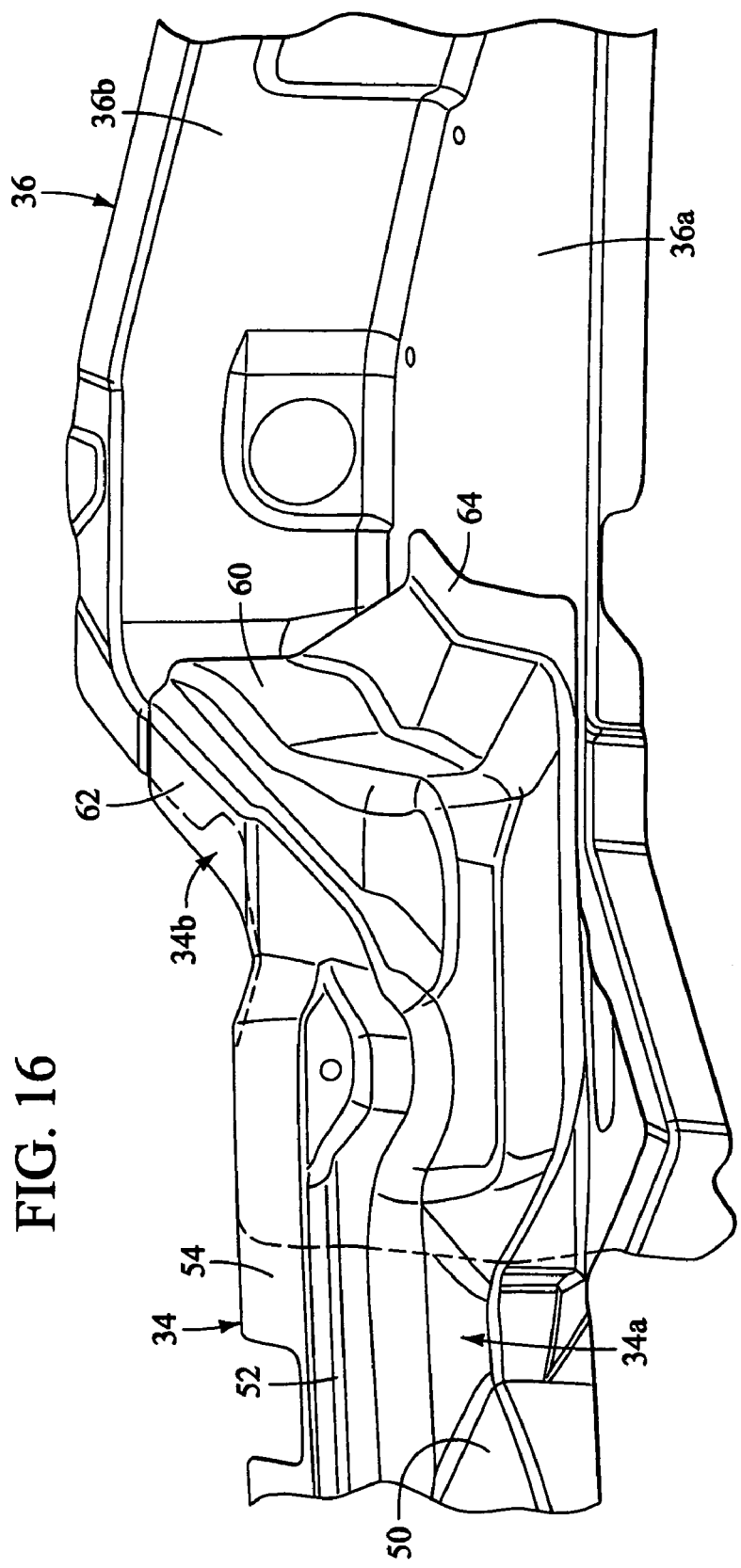
FIG. 16 is a partial side perspective view of the connection between the reinforcement member and the sliding door pocket structure of the rear side rail portion in accordance with the present invention.

As best seen in FIGS. 8 and 12–16, the sliding door pocket structure 36 basically has a base section 36a and an arch-shaped wall 36b that forms a roller pocket for the front roller of the roller structure of the sliding door 14. The arch-shaped wall 36b preferably extends upwardly in a substantially perpendicular direction from the base section 36a. The arch-shaped wall 36b is concaved such that its exteriorly facing surface faces in an outboard direction of the vehicle body structure 12. The arch-shaped wall 36b has its concaved exterior surface located inwardly of the main longitudinal axis A of the roof side rail 20. The forward end of the sliding door pocket structure 36 and the rearward end of the side rail reinforcement member 34 are secured together in an overlapping manner, as best seen in FIGS. 15 and 16. In other words, the overlapping area of the side rail reinforcement member 34 and the sliding door pocket structure 36 lies inboard of the inner edge of the portion of the side rail 20 that is located in front of the center pillar 22. Preferably, the overlapping area of the side rail reinforcement member 34 and the sliding door pocket structure 36 lies in at least two generally perpendicular planes. In any event, the overlapping area of the side rail reinforcement member 34 and the sliding door pocket structure 36 at least preferably has a three dimensional cross section that resist deformation.

As seen in FIGS. 4–7, the center pillar 22 preferably includes an inner center pillar part 22a and an outer center pillar part 22b that are fixedly coupled together, e.g., welded, to form an integrated unit having a hollow interior. Preferably, the inner and outer center pillar parts 22a and 22b are formed of a rigid material such as sheet metal that are configured and arranged utilizing conventional automotive manufacturing techniques.

The center pillar 22 has a minimum width section C defining a minimum front to aft width of the center pillar 22 that is substantially located in a front to aft direction that is near the connection between the front side rail portion 30 and the rear side rail portion 32. Stated differently, the minimum width section C of the center pillar 22 is located such that a majority of the minimum front to aft width section C of the center pillar 22 overlaps with the side rail reinforcement member 34 in the front to aft direction of the vehicle body structure 12. Preferably, the leading edge of the minimum width section C is substantially aligned with the joint formed between the inner side rail part 30a and the main support part 32a. The side rail reinforcement member 34 extends in a front to aft location above the center pillar 22 such that the side rail reinforcement member 34 is at least partially located in front of and partially rearwardly of the minimum front to aft width section of the center pillar 22.

Figure 7:
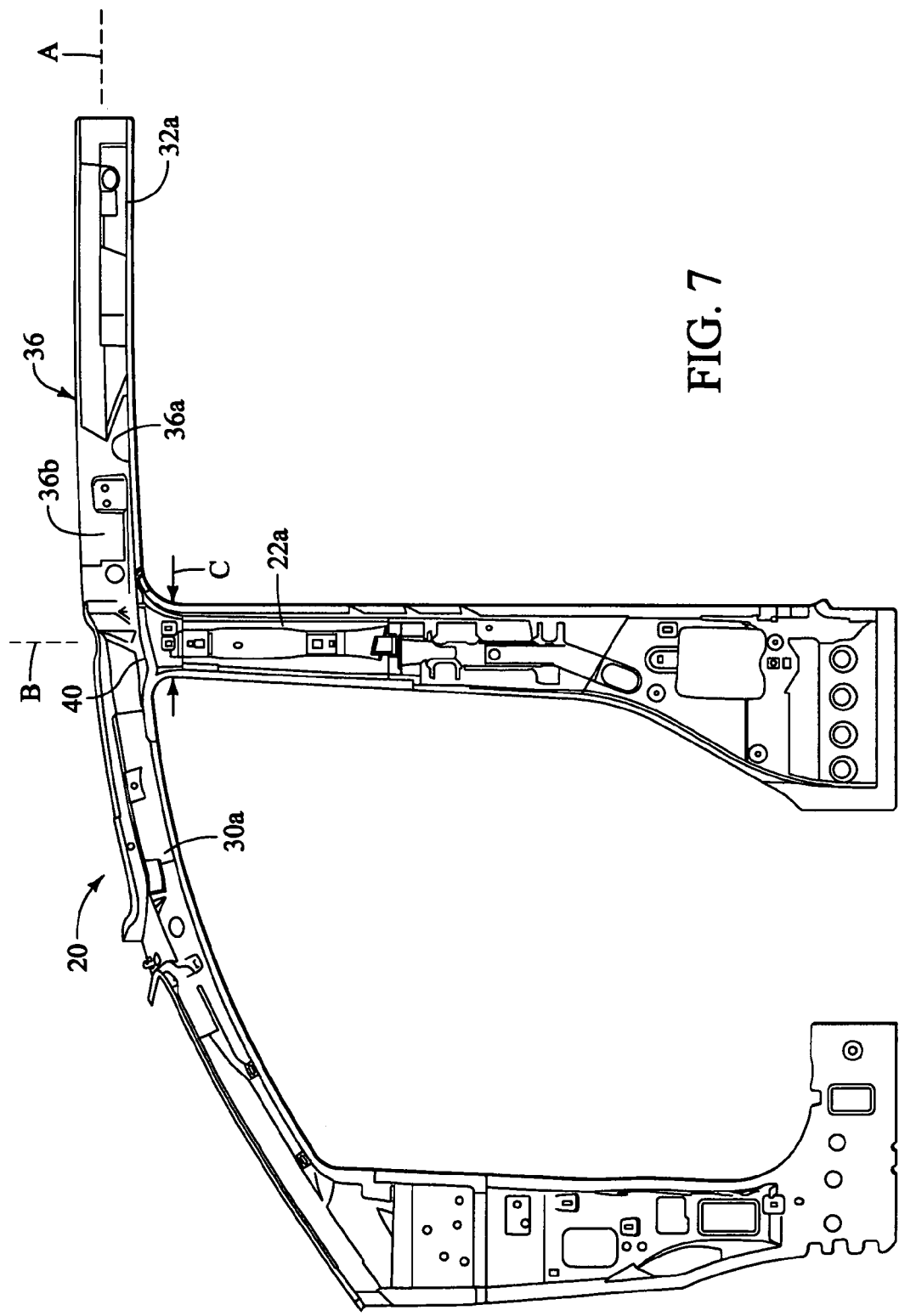
FIG. 7 is a side elevational view of the left side of the vehicle body structure similar to FIGS. 5 and 6, with the exterior layers and the reinforcement members removed for purposes of illustration.
Figure 13:
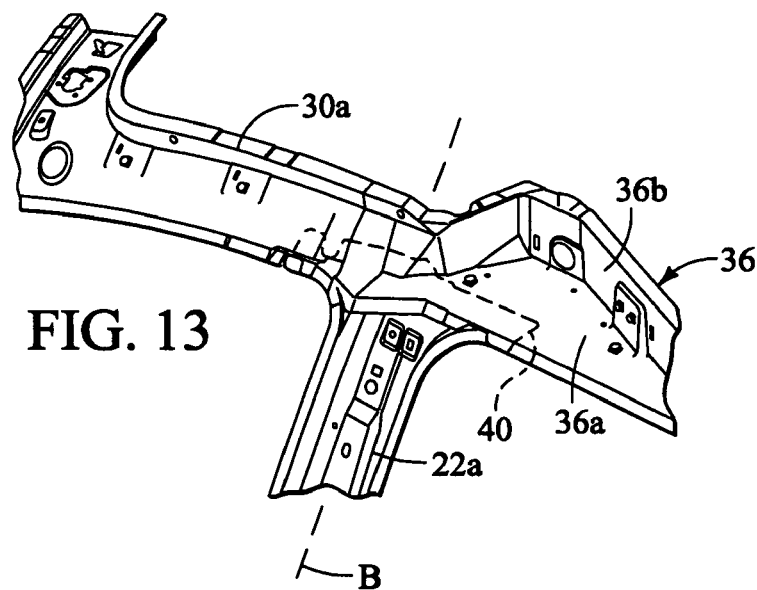
FIG. 13 is a partial perspective view of the left side roof rail with the inner center pillar part coupled thereto in accordance with the present invention.
Figure 14:
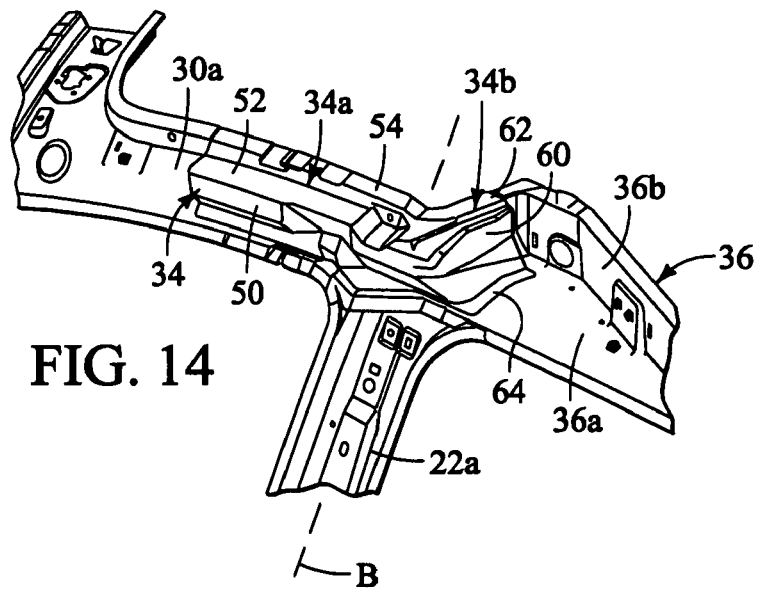
FIG. 14 is a partial perspective view of the left roof side rail with the inner center pillar part and the side rail reinforcement member installed thereon in accordance with the present invention.

As best seen in FIGS. 7 and 13, the inner center pillar part 22a has an upper end 40 that flairs outwardly in the forward and rearward directions of the vehicle body structure 12. The upper end 40 of the inner center pillar part 22a is coupled to both the front side rail portion 30 and the main support part 32a. The center vertical axis B of the center pillar 22 that bisects the minimum width section C of the center pillar 22 is preferably substantially aligned with the leading edge of the sliding door pocket structure 36.

Figure 5:
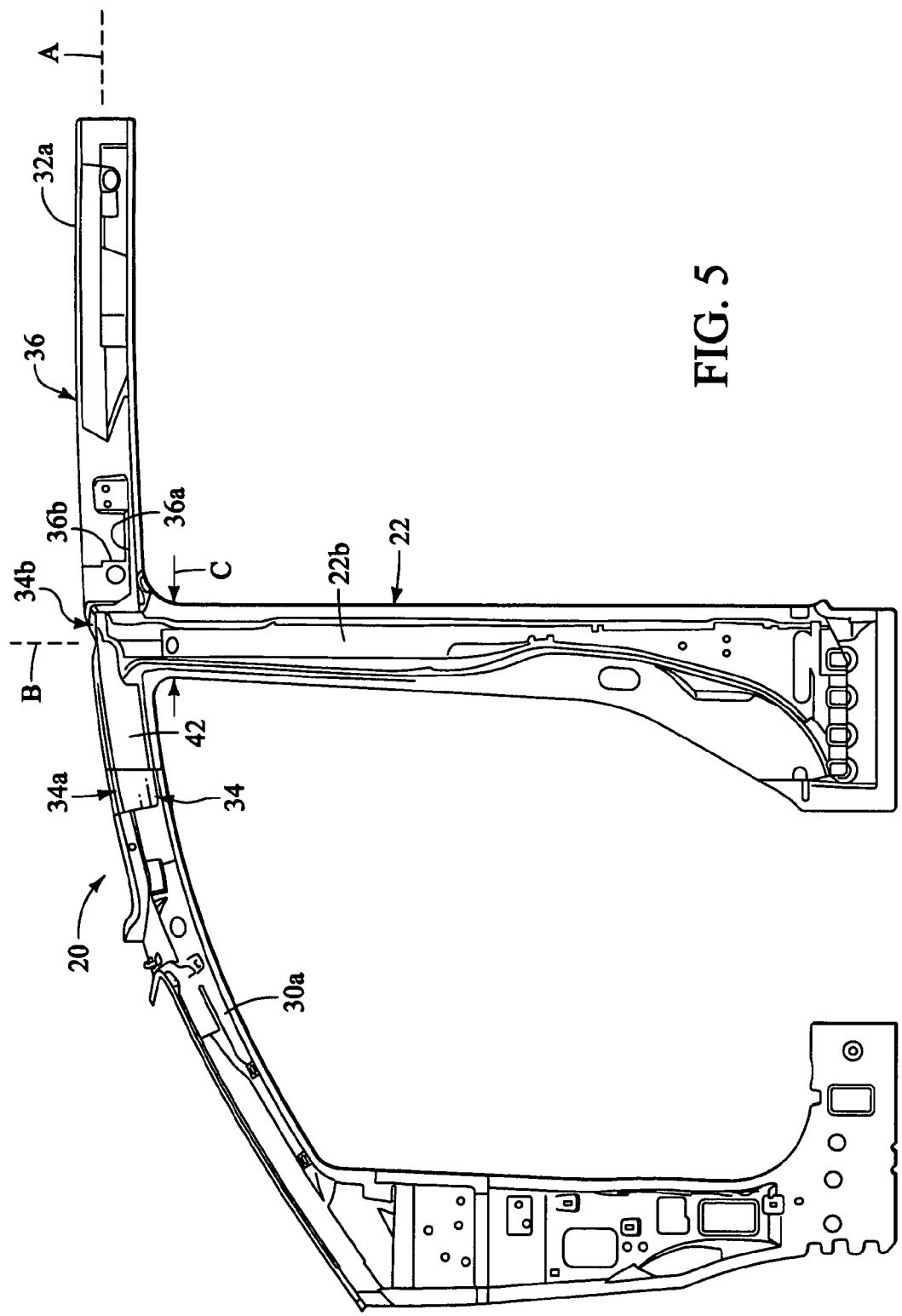
FIG. 5 is a side elevational view of the main parts of the left side of the vehicle body structure with the exterior sheet metal layer and the outer side rail part removed for purposes of illustration.
Figure 6:
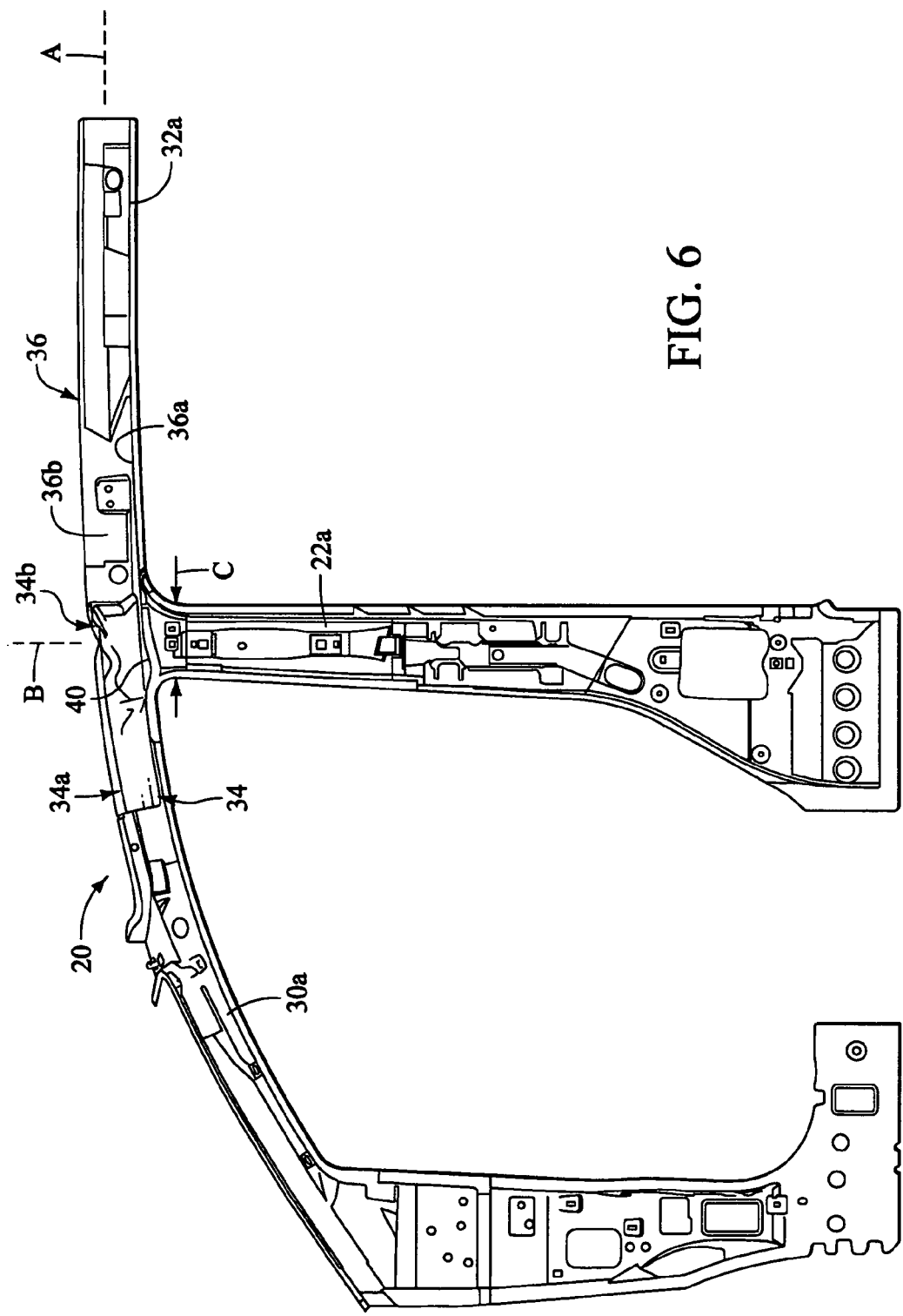
FIG. 6 is side elevational view of the left side of the vehicle body structure, similar to FIG. 5, with additional exterior portions removed for purposes of illustration to show the reinforcement member.
Figure 17:
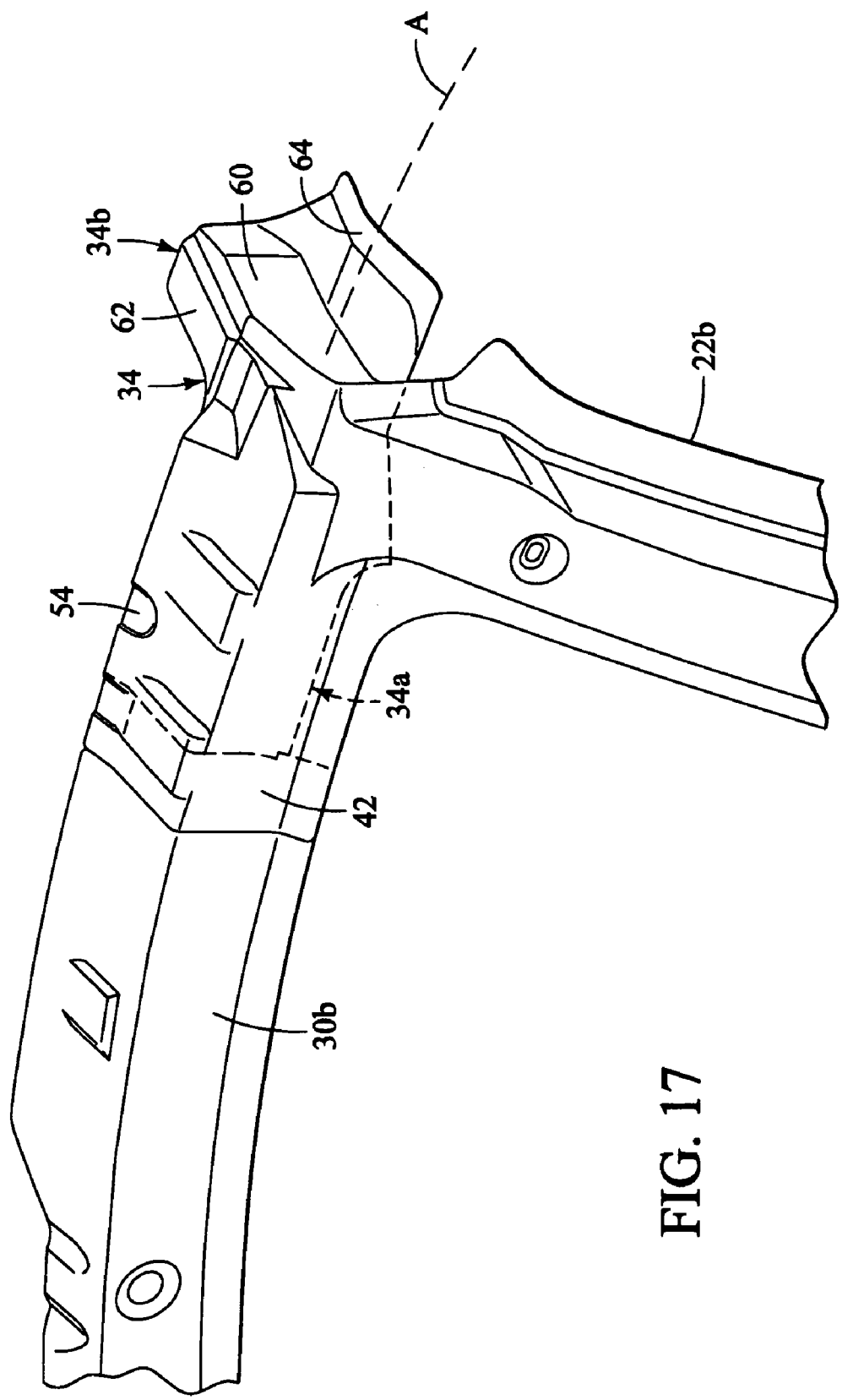
FIG. 17 is a perspective view of the outer front side rail part, the outer center pillar part and the side rail reinforcement member coupled together in accordance with the present invention.
Figure 18:
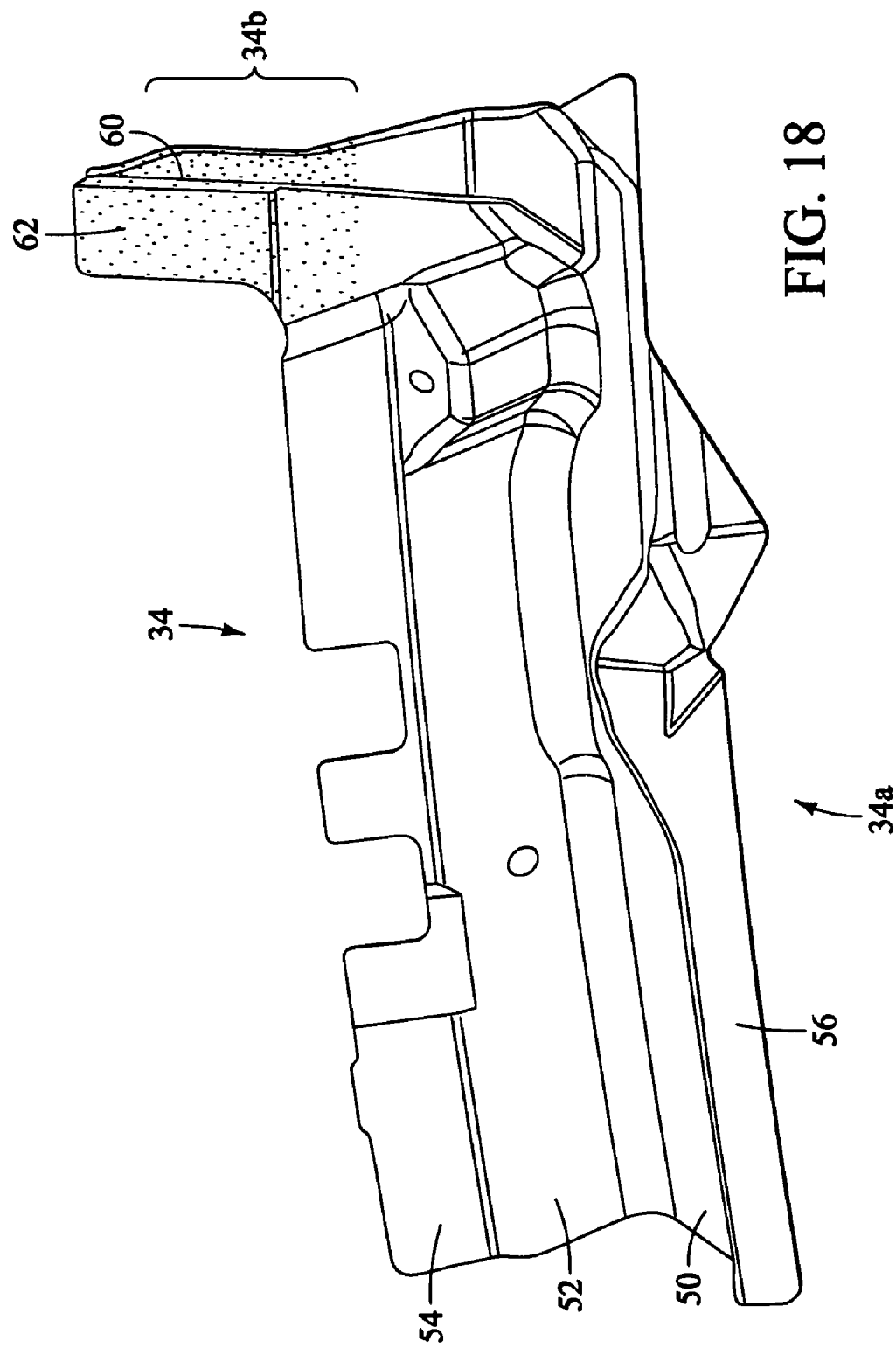
FIG. 18 is a perspective view of the side rail reinforcement member in accordance with the present invention.
Figure 19:
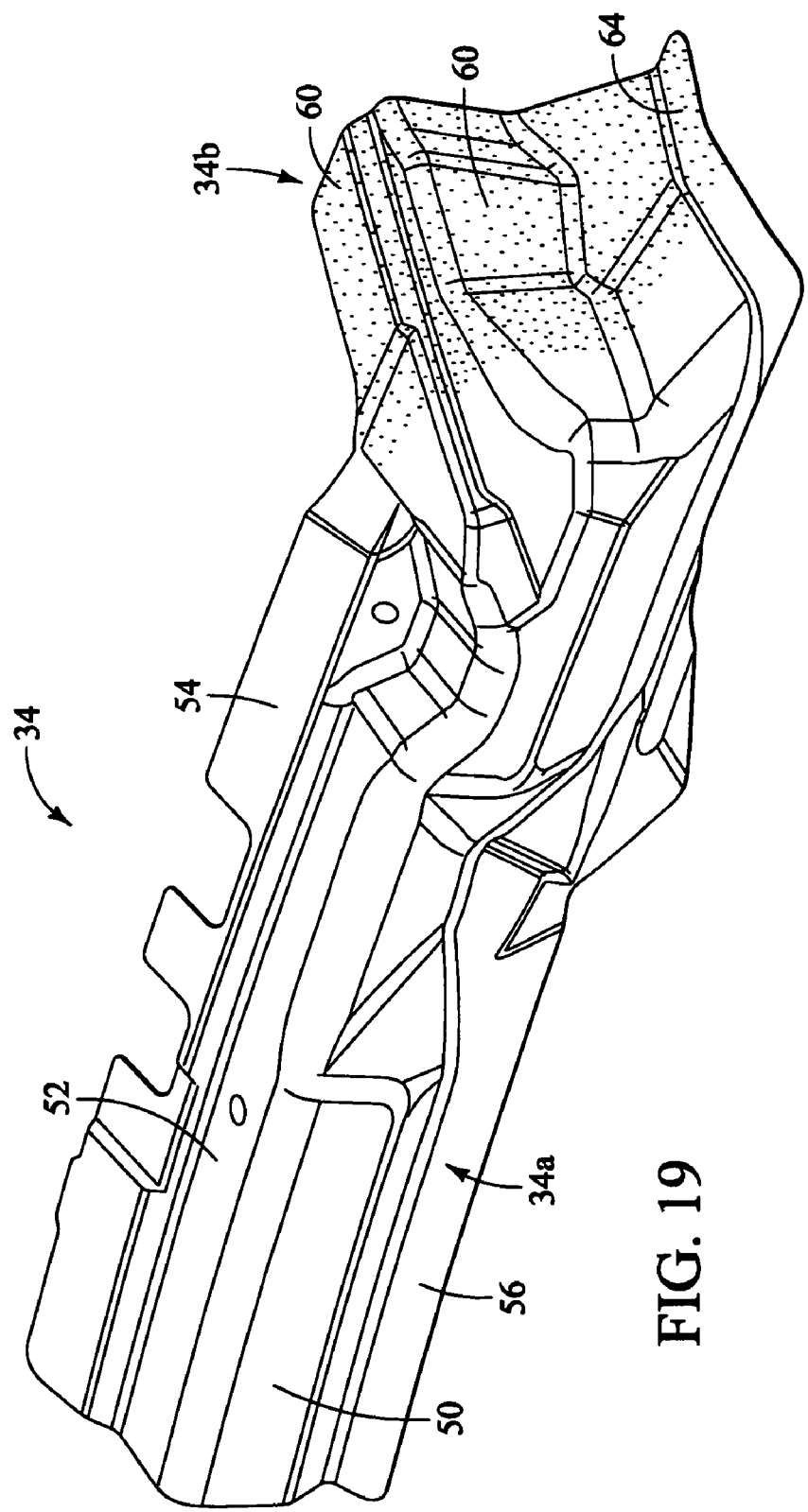
FIG. 19 is another perspective view of the side rail reinforcement member in accordance with the present invention.
Figure 20:
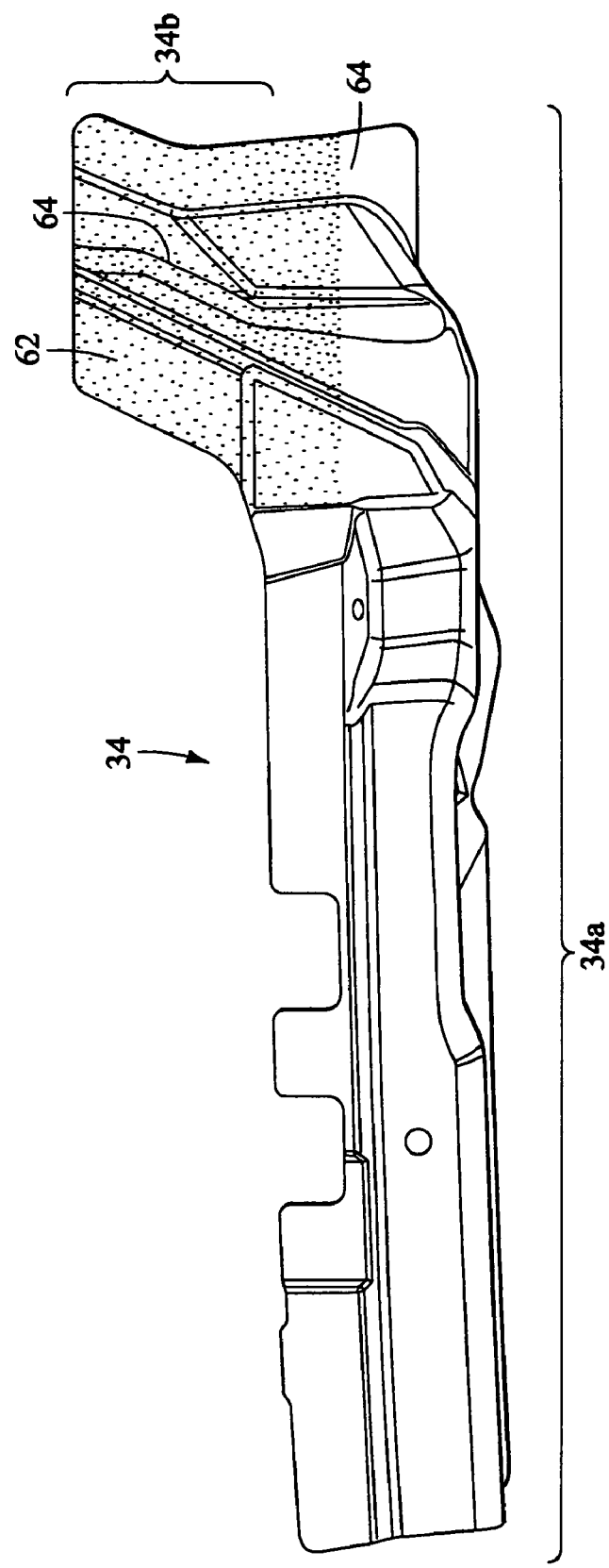
FIG. 20 is a top plan view of the side rail reinforcement member in accordance with the present invention.
Figure 21:
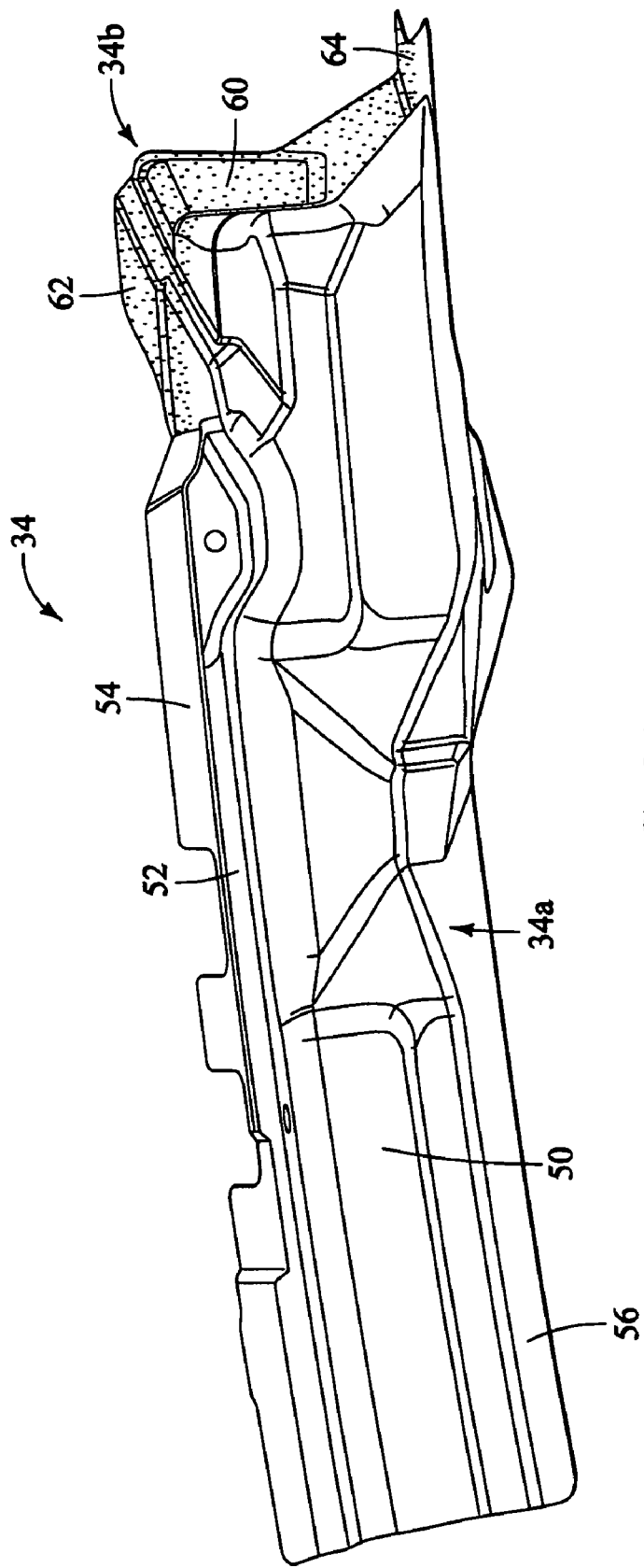
FIG. 21 is a side elevational view of the side rail reinforcement member in accordance with the present invention.

As best seen in FIGS. 5 and 17, the outer center pillar part 22b has an upper end 42 that forms a part of the front side rail portion 30. In other words, the upper end section 42 of the outer center pillar part 22b extends forwardly from the center pillar 22 and has a cross-sectional profile that substantially corresponds to the outer side rail part 30b. The upper end section 42 overlies a portion of the side rail reinforcement member 34 as best seen in FIG. 17.

Turning now to FIGS. 18–21, the side rail reinforcement member 34 is preferably a rigid member such as a contoured sheet metal member that is constructed utilizing conventional automobile manufacturing techniques. Basically, the side rail reinforcement member 34 is a one-piece, unitary member that can be effectively divided into a first side rail reinforcement section 34a and a second side rail reinforcement section 34b (indicated by the shaded area in FIGS. 18–21). Basically, the first side rail reinforcement section 34a is defined by the portion of the side rail reinforcement member 34 that extends substantially in a longitudinal direction of the vehicle, while the second side rail reinforcement section 34b is that portion of the side rail reinforcement member 34 that projects inwardly relative to the front side rail portion 30.

Preferably, as seen in FIGS. 10 and 11, the side rail reinforcement section 34a includes a first wall 50 and a second wall 52 that form a substantially inverted L-shaped or inverted V-shaped cross-sectional profile. Preferably, the free end of the second wall 52 has mounting tabs 54 that are sandwiched between the upper longitudinal edges of the inner side rail part 30a and the outer side rail part 30b such that they are rigidly connected together. The first wall 50 also preferably has a mounting portion 56 that is bonded to at least the inner side rail part 30a. Preferably, the interiorly facing surfaces of the first and second walls 50 and 52 of the side rail reinforcement section 34a are arranged such that the side rail reinforcement member 34 is concaved relative to the longitudinal axis of the roof side rail 20.

Figure 8:
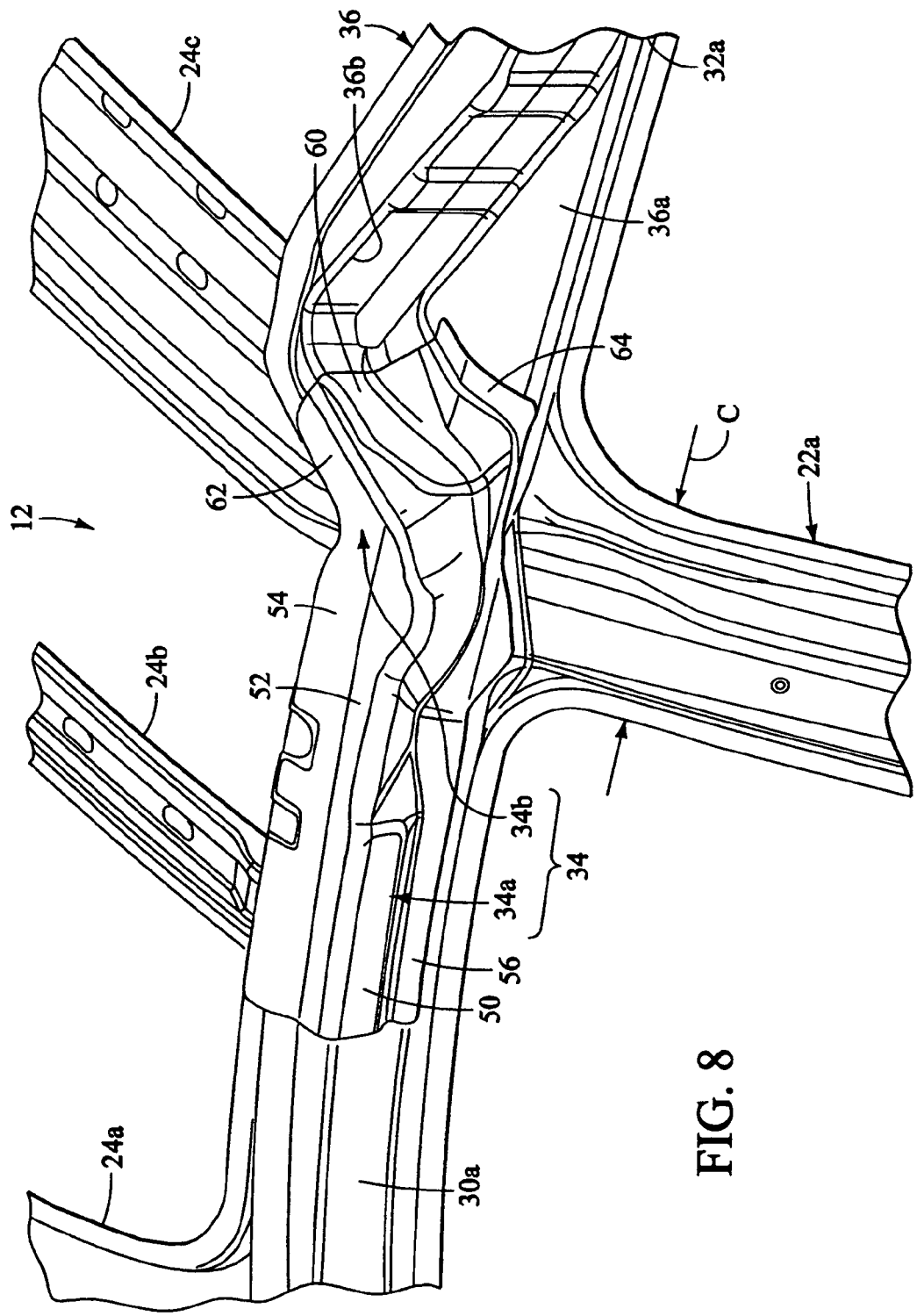
FIG. 8 is an enlarged, partial perspective view of the upper portion of the left side of the vehicle body structure in accordance with the present invention.

As seen in FIG. 8, the first side rail reinforcement section 34a preferably extends in a forward to aft direction of the vehicle body structure 12 along the longitudinal axis of the roof side rail 20 such that a portion of the side rail reinforcement section 34a is located on the front side and the rear side of the minimum width section C of the center pillar 22. The side rail reinforcement section 34b is preferably located at the rear end of the first side rail reinforcement section 34a and projects inwardly relative to the roof side rail 20.

The second side rail reinforcement section 34b also preferably has at least a substantially inverted L-shaped or inverted V-shaped cross-sectional profile that is formed by a first wall 60 and a second wall 62. Moreover, the second side rail reinforcement section 34b preferably has an additional mounting tab 64 that extends outwardly from the bottom side of the first wall 60 that is opposite the second wall 62. Thus, the overall cross-sectional profile of the second side rail reinforcement section 34b is substantially Z-shaped. Basically, the first walls 50 and 60 of the first and second side rail reinforcement sections 34a and 34b form a continuous side wall structure, while the second walls 52 and 62 of the first and second side rail reinforcement sections 34a and 34b form a second continuous side wall structure that is arranged substantially perpendicularly. Preferably, the first wall 62 overlies in an overlapping manner with the arch-shaped wall 36b of the sliding door pocket structure 36, while the mounting tab 64 substantially overlies in an overlapping manner the base section 36a of the sliding door pocket structure 36.

Accordingly, the reinforcement member 34 provides reinforcement in a longitudinal direction by the first side rail reinforcement section 34a and a transverse reinforcement by the second side rail reinforcement section 34 overlying the base section 36a and the arch-shaped wall 36b of the sliding door pocket structure 36. Preferably, the second side rail reinforcement section 34b is located substantially at the center area of the center pillar 22 such that when an inwardly directed force is applied to the center pillar 22 such as during a side collision, the side rail reinforcement member 34 minimizes the rotation of the roof side rail 20 about its longitudinal axis. Thus, a more rigid structure is attained for the roof side rail 20.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention. Also, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body structure comprising:
    a center pillar extending in a generally vertical direction of the vehicle body structure;
    a roof side rail fixedly coupled to the center pillar, the roof side rail including a generally longitudinal axis extending in a front to aft direction of the vehicle body structure, a sliding door pocket structure projecting inwardly of the longitudinal axis of the roof side rail to form a front roller receiving recess for a sliding door; and
    a reinforcement member coupled to the roof side rail, the reinforcement member having a first section extending along the longitudinal axis of the roof side rail to one side of the center pillar, and a second section extending inwardly from the first section at a predetermined angle such that the second section overlies the sliding door pocket structure.

2. The vehicle body structure according to claim 1, wherein
    the center pillar has a minimum width section defining a minimum front to aft width of the center pillar that is located such that a majority of the minimum front to aft width of the center pillar overlaps with the first section of the reinforcement member in the front to aft direction of the vehicle body structure.

3. The vehicle body structure according to claim 1, wherein
    the first section of the reinforcement member extends in a front to aft location such that the first section is partially located in front of and in rearwardly of a minimum front to aft width of the center pillar.

4. The vehicle body structure according to claim 1, wherein
    the first section of the reinforcement member extends in a forward direction relative to the center pillar.

5. The vehicle body structure according to claim 1, wherein
    the sliding door pocket structure has a front section that is disposed at a front to aft location corresponding to an upper end of the center pillar.

6. The vehicle body structure according to claim 1, wherein
    the roof side rail includes a front side rail portion extending forwardly of the center pillar with the front rail portion having a substantially closed tubular cross section.

7. The vehicle body structure according to claim 6, wherein
    the first section of the reinforcement member is disposed inside the substantially closed tubular cross section of the roof side rail.

8. The vehicle body structure according to claim 7, wherein
    the front rail portion of the roof side rail includes inner and outer side rail parts that are joined to form the substantially closed tubular cross section of the front rail portion of the roof side rail.

9. The vehicle body structure according to claim 8, wherein
    the center pillar includes inner and outer center pillar parts with an upper end of the inner center pillar part lying on an interior side of the reinforcement member and an upper end of the outer center pillar part lying on an exterior side of the reinforcement member.

10. The vehicle body structure according to claim 8, wherein
the inner and outer side rail parts are secured together along longitudinally extending edges and the first section of the reinforcement member is secured to the longitudinally extending edges of the inner and outer side rail parts.

11. The vehicle body structure according to claim 10, wherein
the first section of the reinforcement member includes a mounting tab that is secured between at least a pair of the longitudinally extending edges of the inner and outer side rail parts.

12. The vehicle body structure according to claim 1, wherein
the center pillar includes inner and outer center pillar parts that are coupled to together.

13. The vehicle body structure according to claim 12, wherein
an upper end of the inner center pillar part lies on an interior side of the reinforcement member and an upper end of the outer center pillar part lies on an exterior side of the reinforcement member.

14. The vehicle body structure according to claim 1, wherein
the sliding door pocket structure includes a base section and an arch-shaped wall section extending generally upwardly from the base section relative to the vehicle body structure such that the arch-shaped wall section forms a concaved exteriorly facing surface.

15. The vehicle body structure according to claim 14, wherein
a forward end of the arch-shaped wall section is located at a first front to aft location near the center pillar and a rearward end of the arch-shaped wall section is located at a second front to aft location that is longitudinally spaced from the first front to aft location.

16. The vehicle body structure according to claim 15, wherein
the first front to aft location of the forward end of the arch-shaped wall section is located adjacent a front to aft center point of the center pillar location.

17. The vehicle body structure according to claim 14, further comprising
an upper plate section disposed at an upper edge of the arch-shaped wall section such that the upper plate section is vertically spaced from the base section that is disposed at a lower edge of the arch-shaped wall section.

18. The vehicle body structure according to claim 1, wherein
the first section of the reinforcement member includes at least a pair of longitudinally extending walls that have an L-shaped transverse cross sectional profile.

19. The vehicle body structure according to claim 1, wherein
the second section of the reinforcement member includes at least a pair of longitudinally extending walls that have an L-shaped transverse cross sectional profile.

20. The vehicle body structure according to claim 19, wherein
the sliding door pocket structure includes a base section and an arch-shaped wall section extending generally upwardly from the base section relative to the vehicle body structure such that the arch-shaped wall section forms a concaved exteriorly facing surface, and
the second section of the reinforcement member overlies at least a portion of the arch-shaped wall section of the sliding door pocket structure.

21. The vehicle body structure according to claim 20, wherein
the second section of the reinforcement member further overlies at least a portion of the base section of the sliding door pocket structure.

22. A vehicle body structure comprising:
a center pillar extending in a generally vertical direction of the vehicle body structure;
a roof side rail fixedly coupled to the center pillar, the roof side rail including a generally longitudinal axis extending in a front to aft direction of the vehicle body structure, a sliding door pocket structure projecting inwardly of the longitudinal axis of the roof side rail to form a front roller receiving recess for a sliding door; and
reinforcement means for reinforcing the roof side rail to minimize rotation of the roof side rail about the longitudinal axis of the roof side rail upon application of a inward direction force on the center pillar.

* * * * *